Figure 4:
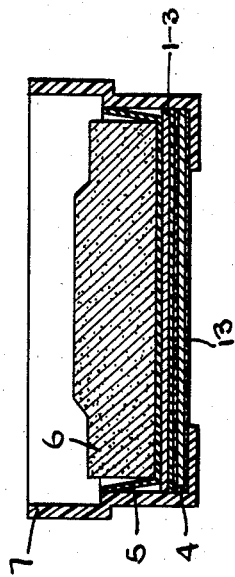

June 21, 1960  R. HUBER ET AL  2,942,057
PRIMARY GALVANIC CELL
Filed June 27, 1958

INVENTORS
R. HUBER
OTTO ZOTTMANN
BY Erich M. H. Radde
AGENT

United States Patent Office 2,942,057
Patented June 21, 1960

2,942,057
PRIMARY GALVANIC CELL

Richard Huber, Ellwangen, Jagst, Germany, and Otto Zottmann, Sao Paulo, Brazil, assignors to Pertrix-Union G.m.b.H., Ellwangen, Jagst, Germany, a corporation of Germany Filed June 27, 1958, Ser. No. 745,091

5 Claims. (Cl. 136—145)

The present invention relates to primary galvanic cells, and more particularly to primary cells comprising a depolarizer element, a soluble negative electrode, a multi-layer absorptive separator arranged therebetween, a non-alkaline electrolyte in the pores of the cell parts, and an outer electrolyte containing electrolyte-gelling agents.

The term "outer electrolyte" defines the electrolyte outside the pores of the cell parts. The "inner electrolyte" in the pores may be neutral or acidic.

Two types of primary cells with multi-layer separators are known:

(1) The separator consists of paper or a fabric carrying a flour paste layer containing the outer electrolyte.

(2) The separator consists of a paper or a fabric carrying a film of a swellable plastic which has been made insoluble in the electrolyte.

The cell of type (1) has the disadvantage that the flour paste layer migrates from the zinc surface of the soluble negative electrode through the paper or fabric into the depolarizer element when the cell is stored for any length of time and particularly when it is stored under tropical weather conditions, i.e., at temperatures of 40° C. and higher. This causes the paper or fabric having electrolyte absorbed therein to come to lie in direct contact with the zinc plate, causing contact corrosions. Furthermore, the depolarizer will decompose the flour paste to carbon dioxide at the high temperatures mentioned.

This has the further disadvantage that the separator is used up and gas is evolved in the cell.

The cell of type (2) has the disadvantage that the absence of the flour paste layer causes the plastic film to be in direct contact with the soluble negative electrode, causing contact corrosions similarly to those caused by direct contact between paper or fabric and the adjacent electrode. In addition, the contact between the plastic film and the surface of the soluble electrode is not as intimate as is desirable. This causes air pockets which, as is known, ultimately develop into corrosion spots.

It is the principal object of the present invention to overcome these disadvantages of known primary cells and to produce galvanic cells with superior storage properties, even under elevated temperature conditions.

This object is accomplished in accordance with the present invention by providing the cell with a separator consisting of an absorptive carrier substance which is constituted by or which carries a film that is insoluble but capable of swelling in the electrolyte and which is permeable to ions, and a layer of an electrolyte-flour substance provided on said film which substance is in contact with the soluble negative electrode.

Extensive experimentation has shown that the ion-permeable film constitutes a barrier layer fully preventing the flour substance for migrating from the soluble electrode to the depolarizer. On the other hand, the electrolyte-containing flour layer establishes a fully satisfactory contact between the gelled electrolyte and the soluble electrode, as is known per se. This structure also retains the known advantage of the electrolyte gelling agent which assures that the particularly corrosion-preventive gluten constituents of the flour retain this property.

The absorptive carrier substance of the separator may be any type of paper, for instance, a capillary filter paper or kraft paper, or a fabric of natural and/or synthetic fibers, as used in conventional primary galvanic cells.

The essential feature of the invention is the intermediate film arranged between the depolarizer and the electrolyte-soaked cereal paste. This film consists of a plastic which is insoluble in the electrolyte but is ion-permeable. Such ion-permeable films may consist of a plastic film which is insoluble in the electrolyte but is swollen by it. A preferred plastic film is made of the aluminum salt of carboxymethyl cellulose. Another swellable but insoluble film may be made of formaldehyde-hardened gelatine.

Other suitable substances for the intermediate film include micro-porous materials which may not be swollen by the electrolyte but which are ion-permeable. For instance, acetyl cellulose films or films of other film-forming plastic materials may be made micro-porous, for instance, by adding zinc chloride to an acetyl cellulose solution or to solutions of other film-forming plastic materials. Such a solution, after it has been applied to the separator carrier substance and after it is dried, forms, on contact with the electrolyte which dissolves the zinc chloride particles embedded in the dried separator, a micro-porous film which is insoluble in the electrolyte.

The ion-permeable film carrying the cereal paste may either be applied to the absorptive carrier substance of the separator or it may constitute this absorptive carrier substance.

Figure 1:
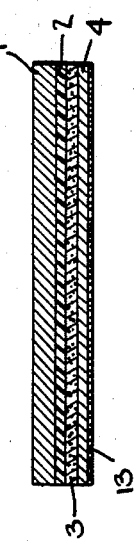
Figure 2:
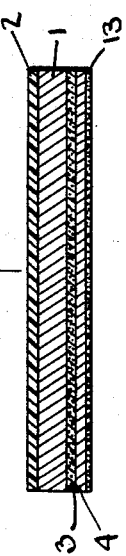
Figure 3:
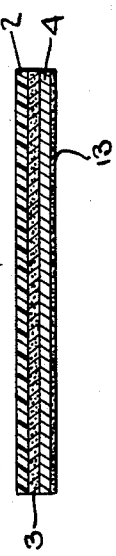

The invention will be more fully described in the following preferred embodiments, taken in conjunction with the accompanying drawing wherein Figs. 1 to 3 are cross-sectional views illustrating different embodiments of the separator according to the present invention.

Figure 5:
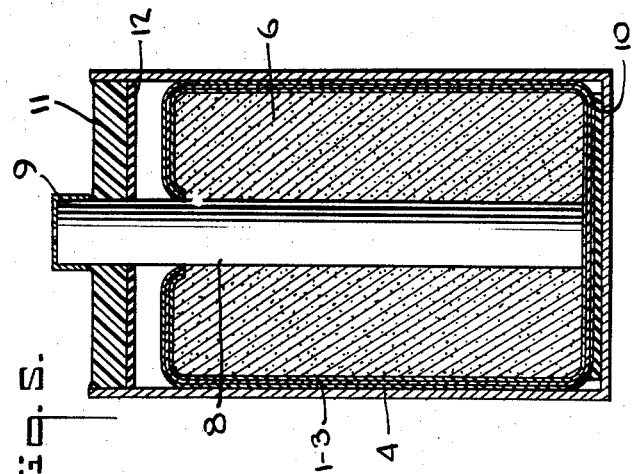

Fig. 4 is a vertical section through one type of cell incorporating a separator according to the present invention; and Fig. 5 is a vertical section through another type of galvanic cell.

In these figures like parts are indicated by like reference numerals.

Referring now to the drawing, Fig. 1 shows a soluble zinc electrode plate 4 provided with an adhering layer of granular carbon 13, i.e., with a layer capable of conducting electrons but resistant to chemicals. Said layer may preferably be a conductive lacquer layer or a thin conductive foil of suitable plastic material. It is arranged adjacent the assembled separator consisting of the bibulous or absorptive carrier 1, of paper or fabric, the ion-permeable film 2 which is insoluble in the electrolyte but may be swellable therein, and the cereal paste layer 3 which contains electrolyte and is, of course, in direct contact with the zinc anode 4.

In Fig. 2, the electrolyte-containing flour paste layer 3 again is in direct contact with zinc plate 4 which is coated with conductive layer 13. It is carried directly by the absorptive carrier 1 which, on its other side, carries the ion-permeable film 2.

In the embodiment of Fig. 3, the separator consists only of the ion-permeable film 2 and the electrolyte-soaked flour paste layer 3 in contact with the anode 4 coated on its opposite side by conductive layer 13. In this embodiment of the present invention no separate carrier is provided.

In all three embodiments, the cereal paste layer 3 is in direct contact with the soluble electrode 4 and the ion-permeable film 2 which is insoluble in the electrolyte is interposed between the layer 3 and the depolarizer which is arranged on the side of the separator opposite to that of the anode.

A cell incorporating the separator structure 1, 2, 3, of either Fig. 1 or 2 is shown in Fig. 4. The cell housing 7 may consist of any conventional and suitable material, such as plastic. The soluble electrode 4, which may be a flat sheet of zinc and which is coated on one side with conductive layer 13, is placed at the bottom of the housing 7 and the separator structure 1, 2, 3 of Figs. 1 and 2 or the separator structure 2, 3 of Fig. 3 is arranged thereover. Depolarizer element 6 is placed over said separator and separated therefrom by pellicle 5. Said pellicle 5 which, preferably, consists of ordinary kraft paper or of an absorbent paper sheet which surrounds the depolarizer element 6 at its bottom and side walls, has the purpose of avoiding short circuits due to crumbling depolarizer material and may be omitted, if desired.

Fig. 5 shows a paper-lined cell comprising a zinc cup 4 forming an anode. The bottom disc 10 of insulating material is placed between electrode 4 and separator structure 1, 2, 3 which is also cup-shaped and lines the zinc cup. Inside the separator and fully enveloped thereby is the depolarizer element 6 and the central carbon rod 8 which protrudes from the depolarizer mass. The cell is closed by annular cardboard disc 12 supporting seal 11. Brass cap 9 is mounted on the outer end of the carbon rod.

As stated hereinabove, the preferred substance for the intermediate film of the invention is the aluminum salt of carboxy methyl cellulose. This film, which is insoluble in the electrolyte but swellable therein and permeable to ions, may be prepared by dissolving the salt in an aqueous solution of a volatile base, such as ammonium hydroxide, and to form the solution into a thick paste. This has the particular advantage of providing an already hardened starting material which requires no further hardening agent, as needed in the known type of cell described under (2) in the introductory part of this description. The disadvantage of this known type resides in the fact that the hardening agents often have properties which are damaging to the cell. This disadvantage is avoided by the method of preparation hereinabove described.

In accordance with the present invention, the swollen paste of aluminum salt of carboxy methyl cellulose may be applied to the absorptive carrier of the separator and dried thereon to form the desired film. The layer of cereal paste and electrolyte may then be applied over the intermediate film and the entire assembly may be dried again to provide a complete separator structure. This structure is then moistened again only when it is assembled in the cell.

The electrolyte-cereal paste may be of a conventional composition, i.e., it may contain water, an electrolyte salt, a filler to fill the pores, a surface tension reducing agent, a mercury compound, and a gelling or thickening agent.

The electrolyte salt may be any of the conventional electrolyte salts used in dry batteries, such as ammonium chloride, magnesium chloride, calcium chloride, zinc chloride, lithium chloride, magnesium bromide, and any of the chemical compounds which are used in cold resistant batteries, such as the hydrochlorides of aliphatic amines, diamines, alkanol amines, for instance, the hydrochlorides of dimethylamine, trimethylamine, ethylamine, diethylamine, triethylamine, ethylene diamine, ethanolamine, and the like and especially of methylamine.

The filler may be aluminum oxide, magnesium oxide, or zinc oxide.

The surface tension reducing agent or inhibitor may be selected from the class of alkyl sulfonates or phenyl alkyl compounds. It may also be polyethylene oxide or polyglycol ether compounds. Said surface-active agent has the effect that, after contact of the zinc plate with electrolyte solution or water, the zinc surface is completely wetted with the electrolyte liquid or paste. As a result thereof, no inclusion of atmospheric oxygen between electrolyte paste and zinc plate takes place and zinc corrosion is avoided or considerably retarded.

The mercury compound is used to amalgamate the zinc electrode and may be mercuric chloride, mercuric sulfate, or mercuric oxide if it is added to the depolarizer mass. While mercuric oxide dissolves with greater difficulty, it will gradually form a solution and amalgamate the zinc electrode, thereby lessening its corrosion.

While zinc is the preferred metal for the soluble electrode, other materials have been used and are suitable, for instance, magnesium or aluminum.

The electrolyte thickening or gelling agent may be flour, starch, or mixtures of flour and starch, preferably coarsely ground wheat flour.

The depolarizer mass is also of conventional composition comprising generally a mixture of graphite or carbon black with an oxidizing agent, such as manganese dioxide, mercuric oxide and the like. Sometimes, a solid electrolyte salt is admixed to the depolarizer mass in a predetermined percentage.

The following examples serve to illustrate the present invention without, however, limiting the same thereto.

*Example 1*

A primary dry cell of the flat cell type is assembled in the following manner:

A flat sheet of zinc 4 is provided with an adherent coating 13 of granular carbon, i.e., of natural or artificial graphite, acetylene black, or the like. A plastic material, such as polyisobutylene and similar materials are used as binder and adhesive.

The separator structure 1, 2, 3 of Figs. 1 and 2 and 2, 3 of Fig. 3 according to the present invention is then placed on top of said zinc sheet 4. This separator structure is composed of the cereal paste 3, the intermediate ion-permeable film 2 which is insoluble in the electrolyte, and the absorptive carrier layer 1. The cereal paste 3 is in direct contact with the zinc surface of zinc sheet 4.

The electrolyte-soaked cereal paste 3 is prepared as known to the art. It has, for instance, the following composition:

| | Parts |
|---|---|
| Ammonium chloride | 7.0 |
| Zinc chloride | 3.0 |
| Wheat flour | 10.0 |
| Wheat starch | 4.0 |
| Zinc oxide | 0.5 |
| Mercuric oxide | 0.5 |
| The surface tension reducing agent sold under the trademark "Invadin" (Ciba) | 0.5 |
| Water | 90.0 |

The intermediate, electrolyte-insoluble, ion-permeable film 2 is made, for instance, as follows:

| | Parts |
|---|---|
| Aluminum salt of carboxy methyl cellulose | 4.0 |
| Ammonium hydroxide | 1.4 |
| Water | 100.0 |

The aluminum salt is dissolved at a temperature between about 70° C. and about 90° C. in the dilute ammonia solution and, on cooling to room temperature forms a plaste which is applied to the carrier 1 consisting of highly absorptive filter paper.

The separator structure 1, 2, 3 and the zinc plate 4 are assembled so that the electrolyte-soaked cereal paste is in contact with the zinc plate. The depolarizer element 6 is then placed upon the absorptive carrier film 1 (Fig. 1) or the electrolyte-insoluble, ion-permeable film 2 (Figs. 2 and 3). Said depolarizer element is prepared by molding the depolarizer mass to a block of a thickness of about 3.4 mm. which is slightly raised at its center as shown in Fig. 4. The depolarizer mass is composed, for instance, as follows:

|  | Parts |
|---|---|
| Manganese dioxide | 57 |
| Graphite | 21 |
| Ammonium chloride | 9 |
| Zinc chloride | 1 |
| Water | 12 |

The molded depolarizer is impregnated with the inner electrolyte, for instance, of the following composition:

|  | Parts |
|---|---|
| Ammonium chloride | 26.0 |
| Zinc chloride | 8.8 |
| Water | 65.2 |
| Mercuric chloride | 0.02 |

The assembled cell is then placed into the cell housing 7 which is partly open at its bottom and is somewhat enlarged in its upper part as shown in Fig. 4 so that another cell can be inserted into the upper part of the housing 7. The raised part of the depolarizer 6 contacts the conductive granular carbon layer 13 of zinc plate 4 which fits into the lower opening of cell housing 7. In this manner a number of cells are stacked one upon the other to form a plate battery which is encased and connected to terminals in the manner known per se.

Example 2

The composition of the primary galvanic cell is the same as described hereinabove in Example 1. However, pellicle 5 is provided between depolarizer element 6 and separator structure 1, 2, 3, as shown in Fig. 4, in order to prevent short circuiting of the cell by crumbling depolarizer material. Said pellicle 5 is made of kraft paper of a thickness of 50μ.

Example 3

The composition of the primary galvanic cell is the same as described hereinabove in Example 1. However, the electrolyte-insoluble, ion-permeable intermediate film is a formaldehyde-hardened gelatin which is still swellable but is insoluble in the electrolyte. Such a film of formaldehyde-hardened gelatin is prepared, for instance, by applying a hot concentrated aqueous gelatin solution upon a carrier sheet, preferably upon kraft paper. On cooling, a solid gelatin layer is formed on the carrier sheet. Hardening is effected by passing said carrier with its gelatin layer through a 5% formaldehyde solution until the desired degree of hardness is achieved, whereupon the hardened gelatin layer is thoroughly washed.

Example 4

A round dry cell as shown in Fig. 5 is assembled as follows:

The depolarizer bobbin 6 is molded from a mixture of the following composition:

|  | Parts |
|---|---|
| Manganese dioxide | 62 |
| Acetylene black | 8 |
| Ammonium chloride | 14 |
| Zinc chloride | 1 |
| Water | 15 |

Carbon rod 8 is placed into the hole of said bobbin provided therefor.

The bobbin with its carbon rod is enveloped by an absorptive nylon bag forming the carrier 1 and by a porous cellulose acetate film forming the water-insoluble, ion-permeable intermediate film 2. Said film is prepared by coating the carrier 1 with a solution of 70 parts of acetyl cellulose in 1000 parts of a mixture of acetone, methyl acetate, and ethyl acetate (1:1:1) containing intimately distributed therethrough 100 parts of zinc chloride. The zinc chloride dispersed in said film is dissolved on contact with and by the electrolyte in the depolarizer and the cereal paste, thereby yielding the microporous water-insoluble, ion-permeable intermediate film 2.

The depolarizer bobbin 6 with carbon rod 8 enveloped by absorptive carrier 1 and ion-permeable cellulose acetate film 2 is soaked with the electrolyte and is placed into zinc cup 4 containing at its bottom the bottom disk 10 of insulating material (paraffined cardboard) and filled with approximately the required amount of liquid cereal paste 3 of about the following composition:

|  | Parts |
|---|---|
| Ammonium chloride | 25.0 |
| Zinc chloride | 75.0 |
| Calcium chloride | 75.0 |
| Potato starch of low viscosity | 40.0 |
| Swelling starch | 8.0 |
| The surface tension reducing agent sold under the trademark "V 1064 E" (Chem. Werke Huels) | 2.0 |
| Magnesium oxide as filler | 2.0 |
| Mercuric chloride | 2.0 |
| Water | 100.0 |

Enough liquid cereal paste is added that it extends toward the upper edge of the bobbin 6 but does not overflow and cover said bobbin. The assembled dry cell with zinc cup 4, bottom disk 10, separator structure 1, 2, 3, depolarizer bobbin 6, and carbon rod 8 is placed into a water bath to cause gelling of the cereal paste 3. The cell is closed by inserting annular cardboard disk 12 and pouring molten coal tar pitch 11 upon said disk 12. Brass cap 9 is placed upon carbon rod 8 before pitch 11 has solidified.

The resulting dry cell according to the present invention is then further worked up in the customary manner, for instance, encased by a cardboard casing and the like.

While the invention has been described in connection with certain now preferred embodiments, it will be understood that many changes and modifications may occur to those skilled in the art, particularly after benefitting from the present teaching, without departing from the spirit and scope of the present invention as defined in the appended claims.

We claim:

1. An absorptive, multi-layer separator for a primary galvanic cell which includes a depolarizer, a soluble electrode, and a non-alkaline electrolyte, said separator being composed of a film of the aluminum salt of carboxy methyl cellulose and an electrolyte-cereal paste layer containing a surface tension reducing agent, said film and said cereal paste layer forming a unitary separator element, said multi-layer separator being adapted to be inserted in the galvanic cell between the depolarizer and the soluble electrode so that the electrolyte-cereal paste layer is in contact with said soluble electrode.

2. An absorptive, multi-layer separator for a primary galvanic cell which includes a depolarizer, a soluble electrode, and a non-alkaline electrolyte, said separator being composed of a film of the aluminum salt of carboxy methyl cellulose and an electrolyte-cereal paste layer, said film and said cereal paste layer forming a unitary separator element, said multi-layer separator being adapted to be inserted in the galvanic cell between the depolarizer and the soluble electrode so that the electrolyte-cereal paste layer is in contact with said soluble electrode.

3. An absorptive, multi-layer separator for a primary galvanic cell which includes a depolarizer, a soluble electrode, and a non-alkaline electrolyte, said separator being composed of an absorptive carrier, a film of the aluminum salt of carboxy methyl cellulose, said film being superposed on said carrier, and an electrolyte-cereal paste layer being superposed on said film, said carrier, film, and cereal paste layer forming a unitary separator element, said multi-layer separator being adapted to be inserted in the galvanic cell between the depolarizer and the soluble electrode so that the electrolyte-cereal paste layer is in contact with the soluble electrode.

4. An absorptive, multi-layer separator for a primary galvanic cell which includes a depolarizer, a soluble electrode, and a non-alkaline electrolyte, said separator being composed of an absorptive carrier, a film of the aluminum salt of carboxy methyl cellulose, said film being superposed on one side of the carrier, and an electrolyte-cereal paste layer being superposed on the other side of the carrier, said carrier, film, and cereal paste layer forming a unitary separator element, said multi-layer separator being adapted to be inserted in the galvanic cell between the depolarizer and the soluble electrode so that the electrolyte-cereal paste layer is in contact with the soluble electrode.

5. An absorptive, multi-layer separator for a primary galvanic cell which includes a depolarizer, a soluble electrode, and a non-alkaline electrolyte, said separator being composed of an absorptive film of the aluminum salt of carboxy methyl cellulose, and superposed thereon an electrolyte-cereal paste layer, said film and said cereal paste layer forming a unitary separator element, said multi-layer separator being adapted to be inserted in the galvanic cell between the depolarizer and the soluble electrode so that the electrolyte-cereal paste layer is in contact with said soluble electrode.

References Cited in the file of this patent

UNITED STATES PATENTS

| | | |
|---|---|---|
| 1,292,764 | Hambuecken | Jan. 28, 1919 |
| 2,699,460 | Blake | Jan. 11, 1955 |
| 2,745,893 | Chubb et al. | May 15, 1956 |
| 2,762,858 | Wood | Sept. 11, 1956 |
| 2,812,377 | Franquemont | Nov. 5, 1957 |
| 2,829,186 | Kort | Apr. 1, 1958 |
| 2,900,433 | Cahoon | Aug. 18, 1959 |
| 2,904,615 | Hatfield | Sept. 15, 1959 |